United States Patent
Caraccio et al.

(10) Patent No.: US 12,197,631 B2
(45) Date of Patent: Jan. 14, 2025

(54) SECURITY MANAGEMENT OF FERROELECTRIC MEMORY DEVICE

(71) Applicant: Micron Technology, Inc., Boise, ID (US)

(72) Inventors: Danilo Caraccio, Milan (IT); Federica Cresci, Milan (IT); Alessandro Orlando, Milan (IT); Paolo Amato, Treviglio (IT); Angelo Alberto Rovelli, Agrate Brianza (IT); Craig A. Jones, Plano, TX (US); Niccolò Izzo, Vignate (IT)

(73) Assignee: Micron Technology, Inc., Boise, ID (US)

( * ) Notice: Subject to any disclaimer, the term of this patent is extended or adjusted under 35 U.S.C. 154(b) by 431 days.

(21) Appl. No.: 17/562,916

(22) Filed: Dec. 27, 2021

(65) Prior Publication Data

US 2022/0207193 A1    Jun. 30, 2022

Related U.S. Application Data

(60) Provisional application No. 63/132,273, filed on Dec. 30, 2020.

(51) Int. Cl.
*G06F 21/79*    (2013.01)
*G06F 21/10*    (2013.01)
(Continued)

(52) U.S. Cl.
CPC ............ *G06F 21/79* (2013.01); *G06F 21/554* (2013.01); *G06F 21/602* (2013.01);
(Continued)

(58) Field of Classification Search
CPC ...... G06F 21/79; G06F 21/554; G06F 21/602; G06F 21/107; G11C 11/2273; G11C 11/2275; G11C 11/2295; G11C 7/24
See application file for complete search history.

(56) References Cited

U.S. PATENT DOCUMENTS 8,438,452 B2    5/2013  Agarwal et al.
8,910,280 B2   12/2014  Karasaridis
(Continued)

FOREIGN PATENT DOCUMENTS

WO    2008-054058 A1    5/2008

OTHER PUBLICATIONS

International Search Report and Written Opinion from related International Patent Application No. PCT/US2021/065272, dated May 30, 2022, 12 pages.

*Primary Examiner* — Javier O Guzman
(74) *Attorney, Agent, or Firm* — Brooks, Cameron & Huebsch, PLLC

(57) ABSTRACT

Systems, apparatuses, and methods related to security management for a ferroelectric memory device are described. An example method can include receiving, at a memory controller and from a host, a command and firmware data. The memory controller can manage a non-volatile memory device, such as a ferroelectric memory device, and the host and the memory controller can communicate using a compute express link (CXL) protocol. The command can be executed to update firmware stored on the non-volatile memory device. The method can further include accessing a first public key from the non-volatile memory device. The method can further include validating the first public key with a second public key within the firmware data. The method can further include validating the firmware data. The method can further include verifying a security version of the firmware data. The method can further include updating the non-volatile memory device with the firmware data.

7 Claims, 8 Drawing Sheets

(51) Int. Cl.
*G06F 21/55* (2013.01)
*G06F 21/60* (2013.01)
*G11C 11/22* (2006.01)

(52) U.S. Cl.
CPC ...... *G11C 11/2273* (2013.01); *G11C 11/2275* (2013.01); *G11C 11/2295* (2013.01); *G06F 21/107* (2023.08)

(56) References Cited

U.S. PATENT DOCUMENTS

| | | |
|---|---|---|
| 9,213,609 B2 | 12/2015 | Hansen et al. |
| 10,445,236 B2 | 10/2019 | Boyle |
| 2003/0126409 A1 | 7/2003 | Juan et al. |
| 2008/0310633 A1* | 12/2008 | Brown ................. H04L 9/16 380/259 |
| 2010/0005218 A1* | 1/2010 | Gower ............... G06F 13/4234 711/E12.082 |
| 2013/0262880 A1* | 10/2013 | Pong ................. G06F 12/1408 713/193 |
| 2014/0006879 A1 | 1/2014 | Rangarajan |
| 2014/0237261 A1* | 8/2014 | Diep ................. G06F 12/1408 713/189 |
| 2014/0281504 A1 | 9/2014 | Dasari et al. |
| 2017/0068537 A1 | 3/2017 | Ramanujan |
| 2018/0082065 A1* | 3/2018 | Liu ..................... H04L 9/3247 |
| 2018/0217941 A1* | 8/2018 | Horovitz ........... G06F 12/1408 |
| 2018/0357093 A1* | 12/2018 | Cong .................. G06F 12/109 |
| 2019/0243637 A1* | 8/2019 | Nachimuthu .......... G06F 8/656 |
| 2020/0319876 A1* | 10/2020 | Colombo ............... G06F 8/654 |

\* cited by examiner

SECURITY MANAGEMENT OF FERROELECTRIC MEMORY DEVICE

PRIORITY INFORMATION

This application claims the benefit of U.S. Provisional Application Ser. No. 63/132,273, filed on Dec. 30, 2020, the contents of which are incorporated herein by reference.

TECHNICAL FIELD

The present disclosure relates generally to semiconductor memory and methods, and more particularly, to apparatuses, systems, and methods for security management of a ferroelectric memory device.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1:
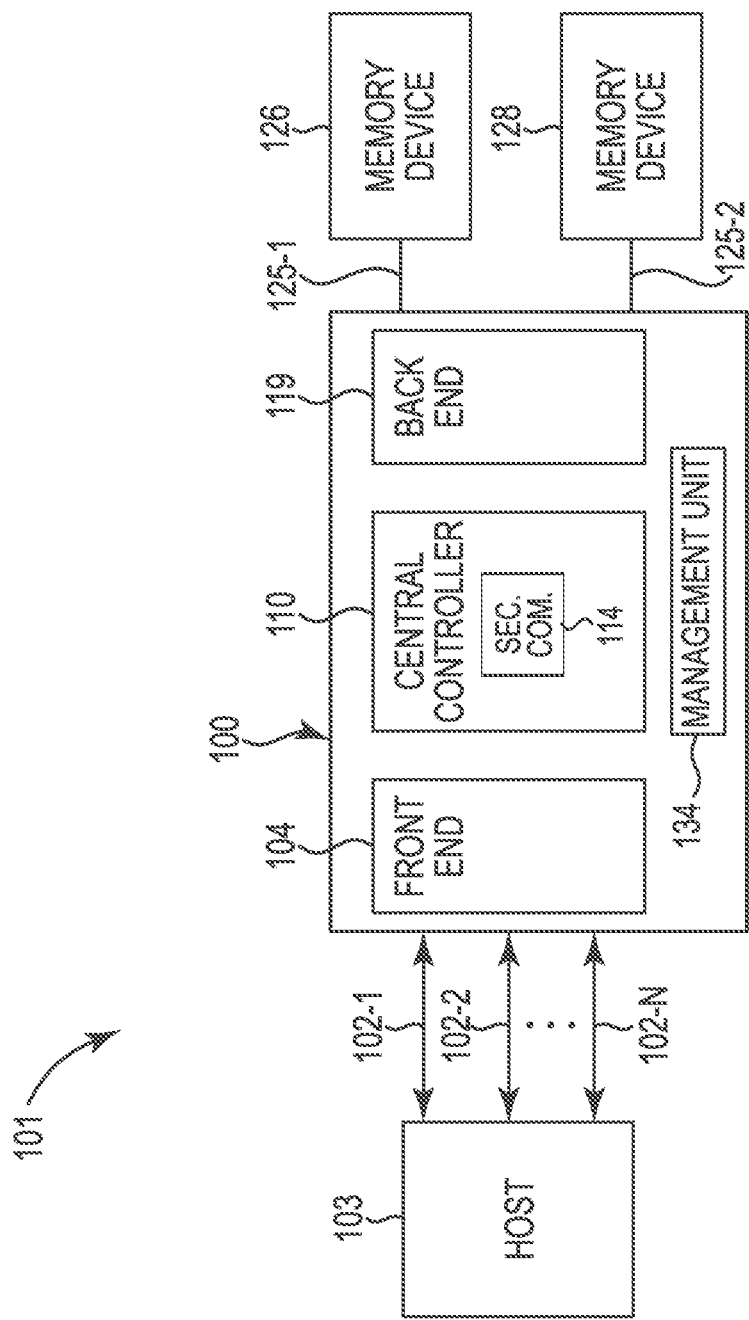
FIG. 1 illustrates a block diagram in the form of a computing system including a controller for security management of a ferroelectric memory device and for data transfer in accordance with a number of embodiments of the present disclosure.

Systems, apparatuses, and methods related to security management for a ferroelectric memory device are described. An example method can include receiving, at a memory controller and from a host, a command and firmware data. The memory controller can manage a non-volatile memory device, such as a ferroelectric memory device, where a compute express link (CXL) protocol is used to communicate between a host and a memory device that includes the memory controller. The command can be executed to update firmware stored on the non-volatile memory device. The method can further include accessing a first public key from the non-volatile memory device. The method can further include validating the first public key with a second public key within the firmware data. The method can further include validating the firmware data. The method can further include verifying a security version of the firmware data. The method can further include updating the non-volatile memory device with the firmware data.

A controller for security management can include a front end portion, a central controller portion, and a back end portion. The central controller portion can include a security component and can be configured to cause perform memory operations for security management. The security component can be configured to encrypt the data before storing the data in the non-volatile memory device and decrypt the data before the data is transferred from the non-volatile memory device.

The controller (herein sometimes referred to as a memory controller) can include a variety of components to manage each of the types of memory devices coupled to the memory controller. In some embodiments, the memory controller can enable or disable certain components (e.g., a security component) depending on whether the components are used to transfer the data from the host to one of the memory devices or secure data transferred from the host to one of the memory devices. For example, a security component associated with the memory controller can be enabled when transferring data to a FeRAM memory device and disabled when transferring data to a volatile memory device, such as a DRAM memory device. The memory controller can also be used to manage one type of memory device, such as an FeRAM memory device or a DRAM memory device.

As data is transferred from a host to memory devices and vice versa, attempts can be made to intercept the data in order to gain unauthorized access to the data and further components of the memory system or to gain knowledge of the commands sent and received by the host in order to send commands from external to the memory system to take control of the memory system by an external device (e.g., such as an interposer, protocol sniffer, or other such hacker device).

In some previous approaches, data can be transferred in a similar way each time the data is written to or read from a memory device. Such patterns from transferring the data in a similar way can be intercepted and used to interpret the transfer of data or the data itself. In contrast, embodiments described herein are directed to a security management of a ferroelectric memory device to secure data transferred between a host and one or more memory devices. By implementing such security, data can be transferred without being intercepted or patterns in the data transfer being determined. Further, because some embodiments of the present disclosure are directed to transferring data in a different way each time the data is transferred, an external device attempting to interpret a pattern of transfer or intercept the data itself can be prevented.

In some embodiments, the memory system can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space (of a host) and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

FIG. 1 illustrates a block diagram in the form of a computing system 101 including a controller 100 for security management of memory (e.g., the memory devices 126, 128) and data transfer in accordance with a number of embodiments of the present disclosure. As an example, the controller 110 can be used to read and/or write data to and from a memory device. The computing system 101 can include a memory controller 100 comprising a front end portion 104, a central controller portion 110, and a back end portion 119. The central controller 110 can include a security component 114. Examples of the security component can include, but are not limited to, hardware, software and/or circuitry configured to implement data encryption, data hashing, data masking, data tokenization, and other security operations described in more detail below. Further, the computing system 101 can be coupled to a host 103 and memory devices 126, 128.

In some embodiments, the memory controller 100 can manage a DRAM memory device 126 and a ferroelectric memory device 128 (e.g., ferroelectric random access memory (FeRAM)) memory device). Further, in some embodiments, instead of managing both a DRAM memory device 126 and a FeRAM memory device 128, the memory controller 100 can be configured to manage either just volatile memory devices, such as DRAM memory devices 126, or just FeRAM memory devices 128.

The front end portion 104 can include a flexible bus interconnect and use CXL protocol layers including CXL.io and CXL.mem. The memory controller 100 can have a front end portion 104 that includes an interface to couple the memory controller 100 to the host 103 through input/output (I/O) lanes 102-1, 102-2, . . . 102-N (individually or collectively referred to as I/O lanes 102) and circuitry to manage the I/O lanes 102. In some embodiments, there can be eight (8) I/O lanes 102 and in other embodiments there can be sixteen (16) I/O lanes 102. In some embodiments, the plurality of I/O lanes 102 can be configured as a single port.

The memory controller 101 can include a central controller portion 110 that can control, in response to receiving a request from the host 103, performance of a memory operation. The memory operation can be a memory operation to read data from a memory device 126, 128 or an operation to write data to a memory device 126, 128. In some embodiments, the central controller portion 110 can, in response to receiving a request from the host 103, control writing of multiple pages of data substantially simultaneously.

The central controller portion 110 can include a cache memory (e.g., the cache 212 illustrated in FIG. 2, herein) to store data associated with performance of a memory operation and/or a security component 114 to encrypt data before the data is stored in the DRAM memory device 126, the FeRAM memory device 128, and/or the cache memory in addition to performing other security operations, as described further below. In some embodiments, in response to receiving a request from the host 103, data from the host 103 can be stored in cache lines of the cache memory. The data in the cache memory can be written to a memory device 126, 128. In some embodiments, the data can be transferred from the cache memory in order to be encrypted using an Advanced Encryption Standard (AES) before being written to a memory device 126, 128. In some embodiments, the data can be encrypted using an Advanced Encryption Standard (AES) encryption before the data is stored in the cache memory. However, embodiments are not so limited, as, for example, the data can be encrypted after being read from the cache memory.

As will be described below, data security can be approached at multiple points along the path of the data and each approach can protect the data at a different location in the memory system. For example, the integrity of the firmware and bootloader code images can be maintained by securing the boot-up of the memory system by executing trusted code and downloading trusted code. In another example, cryptographic secrets can be protected from tampering by disabling sideband interface access at particular points. Side-channel attacks can be prevented by using side-channel attack resistant IPs. In another example, cache attacks can be prevented using a dynamic cache policy. In another example, glitch attacks can be prevented by using glitch attack resistant IPs. In another example, confidence in data at-rest can be maintained by using a crypto component on a controller data-path and data at-rest can be securely executed by using a cryptographic erase and/or sanitize operation. In these ways, the security component 114 can be used in conjunction with other memory components to ensure protection of the data.

The central controller portion 110 can include error correction code (ECC) encoding circuitry (e.g., the ECC encoding circuitry 216 illustrated in FIG. 2, herein) to ECC encode the data and ECC decoding circuitry (e.g., the ECC decoding circuitry 218 illustrated in FIG. 2, herein) to ECC decode the data. As used herein, the term "ECC encoding" can refer to encoding data by adding redundant bits to the data. As used herein, the term "ECC decoding" can refer to examining the ECC encoded data to check for any errors in the data. The ECC encoding circuitry can encode data that will be written to the DRAM memory device 126 and the FeRAM memory device 128. In some embodiments, an error detected in the data can be corrected immediately upon detection. The ECC decoding circuitry can decode data that has been previously ECC encoded.

In some embodiments, the memory controller 100 can comprise a back end portion 119 comprising a media controller and a physical (PHY) layer that couples the memory controller 100 to a plurality of memory ranks. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can be a plurality of channels 125-1, 125-2. As used herein, the term "memory ranks" generally refers to a plurality of memory chips (e.g., DRAM memory chips and/or FeRAM memory chips) that can be accessed simultaneously. In some examples, a memory rank can be sixty four (64) bits wide and each memory rank can have eight (8) pages. In some embodiments, a page size of a first type of memory device (e.g., DRAM memory device) 126 can be larger than a page size of the second type of memory device (e.g., FeRAM memory device) 128. However, embodiments are not so limited to these parameters.

In some embodiments, the memory controller 100 can include a management unit 134 to initialize, configure, and/or monitor characteristics of the memory controller 100. Further, the management unit 134 can be used to execute non-memory functions. Such examples can include logging, error reporting, support of discovery by the host, security protocols management, security functions, etc. Moreover, the management unit 134, in some examples, can include two sub-systems: an open system including a central processing unit (CPU) for a main firmware and related resources and a secure system including a CPU for secure firmware and related resources (including crypto engines such as AES, SHA, RSA (Rivest-Shamir-Adleman), etc.) The management unit 134 can include an I/O bus to manage out-of-band data and/or commands, a management unit controller to execute one or more instructions associated with initializing, configuring, and/or monitoring the characteristics of the memory controller, and a management unit memory to store data associated with initializing, configuring, and/or monitoring the characteristics of the memory controller 100. As used herein, the term "out-of-band data and/or commands" generally refers to data and/or commands transferred through a transmission medium that is different from the main transmission medium of a network. For example, out-of-band data and/or commands can be data and/or commands transferred to a network using a different transmission medium than the transmission medium used to transfer data within the network.

Figure 2:
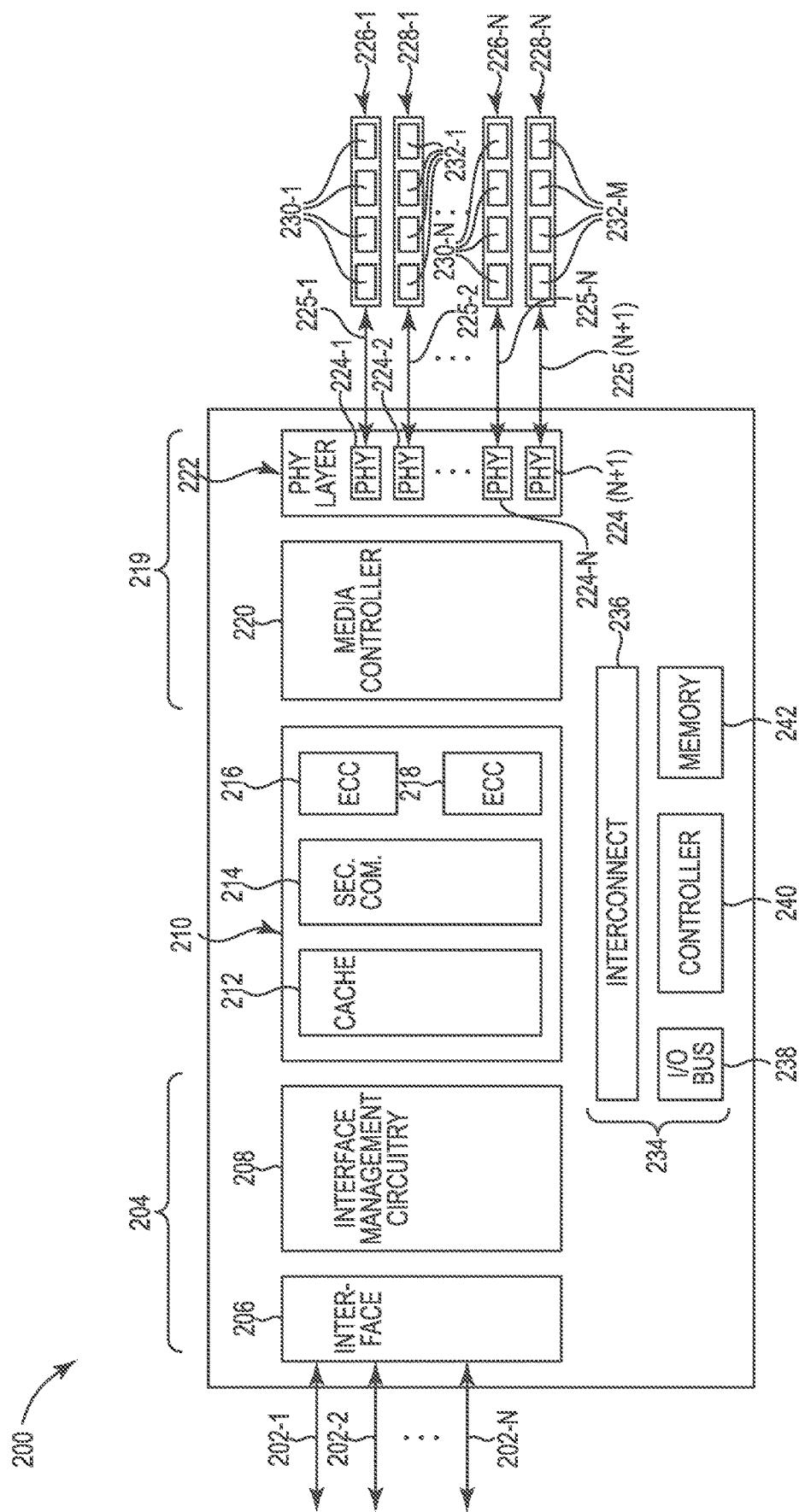
FIG. 2 illustrates a block diagram in the form of a controller for security management of a ferroelectric memory device in accordance with a number of embodiments of the present disclosure.

FIG. 2 illustrates a block diagram in the form of a memory controller 200 for security management for a ferroelectric memory device in accordance with a number of embodiments of the present disclosure. A memory controller 200 is configured to manage a first type of memory device (e.g., DRAM memory device) 226-1, . . . , 226-N (individually or collectively referred to as the first type of memory device 226) that operates according to a first set of timing characteristics and a second type of memory device (e.g., FeRAM memory device) 228-1, . . . , 228-N (individually or collectively referred to as the second type of memory device 228) that operates according to a second set of timing characteristics. Further, in some embodiments, instead of managing both a DRAM memory device 226 and a FeRAM memory device 228, the memory controller 200 can be configured to manage either just DRAM memory devices 226 or just FeRAM memory devices 228. In some embodiments, a memory controller 200 can include a front end portion 204, a central controller portion 210, and a back end portion 219.

As shown in FIG. 2, a front end portion 204 can include an interface 206 that includes multiple I/O lanes 202-1, 202-2, . . . , 202-N (individually or collectively referred to as I/O lanes 202), as well as circuitry 208 to manage the interface 206. The interface 206 can be a peripheral component interconnect express (PCIe) 5.0 interface coupled to the I/O lanes 202. In some embodiments, the memory controller 200 can receive access requests involving at least one of the cache memories 212, the first type of memory device 226, and/or the second type of memory device 228 via the PCIe 5.0 interface 206 according to a CXL protocol. The interface 206 can receive data from a host (e.g., the host 103 shown in FIG. 1) through the of I/O lanes 202. The interface management circuitry 208 may use CXL protocols to manage the interface 206.

A central controller portion 210 can be configured to cause performance of a memory operation and/or a security operation, as described below. The central controller portion 210 can include a cache memory 212 to store data associated with performance of the memory operation. In some non-limiting examples, the cache memory 212 can be a thirty two (32) way set-associative cache memory including multiple cache lines. The cache line size can be equal to the memory controller 200 read granularity. Therefore, each cache line can include 256 bytes of data. In some embodiments, each cache line can comprise 512 bytes of data.

Read and write requests of CXL memory systems can be 64 bytes in size. Therefore, in some non-limiting examples, data entries in the cache memory 212 can have 64 bytes of data. Each cache line can comprise 256 bytes. Therefore, multiple 64 byte requests can be stored in each cache line. In response to a requests from the host, the memory controller 200 can write 256 bytes of data to a memory device 226, 228. In some embodiments, the 256 bytes of data can be written in 64 byte chunks.

As shown in FIG. 2, a central controller portion 210 can include a security component 214 to encrypt data before storing the data in the DRAM device 226 or FeRAM memory device 228 and decrypt the data before the data is transferred to the host from the DRAM memory device 226 or the FeRAM memory device 228. As stated before, the security component 214 can use an AES encryption to encrypt the data. In some embodiments, the security component 214 may encrypt data that is written to the FeRAM memory device 228 but may not encrypt the data that is written to the volatile memory device (e.g., DRAM memory device 226). In the alternative, in some embodiments, the security component 214 may encrypt data that is written to the volatile memory device (e.g., DRAM memory device 226) and may not encrypt data that is written to the FeRAM memory device 228. The data written to the FeRAM memory device 228 may be encrypted because the FeRAM memory device 228 can have security deficiencies that the DRAM memory device 226 does not have. The security component 214 can be bypassed when it is not used. In some embodiments, the security component 214 can be enabled or disabled. For example, the security component 214 can be enabled when writing memory to a persistent memory device, such as an FeRAM memory device 228.

As shown in FIG. 2, the central controller portion 210 can include error correction code (ECC) circuitry to ECC encode the data and ECC decode the data. In some embodiments, the memory controller 210 can implement low power chip kill (LPCK) error correction. As used herein, the term "chip kill" generally refers to a form of error correction that protects memory systems (e.g., the memory system 101 shown in FIG. 1) from any single memory chip failure as well as multi-bit error from any portion of a single memory chip. One approach for chip kill protection is on-the-fly correction implementation. On-the-fly correction can form a plurality of codewords out of four (4)-bit symbols of each of a plurality of die (e.g., memory chip). For example, if there are eleven (11) die each containing 4 separate bit symbols, with each bit symbol containing 4 bits, the 11 die can form 4 codewords each with 11 separate bit symbols comprising a total of forty four (44) bits per codeword.

In some embodiments, a first codeword can comprise the first bit symbol of each die, a second codeword can comprise the second bit symbol of each die, a third codeword can comprise the third bit symbol of each die, and a fourth codeword can comprise the fourth bit symbol of each die. In other words, the eight data bit symbols and 3 parity bit symbols of a codeword can be stored in eleven (11) die. Eight (8) of the 11 die can contain data bit symbols and the three (3) remaining die of the 11 die can contain parity bit symbols. Adding 3 parity bit symbols can allow the central controller portion 210 to correct up to one symbol error in each codeword and to detect up to two symbol errors. If instead of adding 3 parity bit symbols, only two (2) parity bits are added, the central controller portion 210 can correct up to one symbol error but only detect one symbol error. In some embodiments, the data bit symbols and the parity bit symbols can be written or read concurrently from the 11 die by the ECC encoding circuitry 216 and the ECC decoding circuitry 218. If every bit symbol in a die fails, only the bit symbols from that die in the codeword will fail. This allows memory contents to be reconstructed despite the complete failure of one die.

As shown in FIG. 2, the memory controller 200 can include a back end portion 219, including a media controller portion 220 comprising a plurality of media controllers and a physical (PHY) layer portion 222 comprising a plurality of PHY layers 224-1, 224-2, 224-N, ..., 224-(N+1) (individually or collectively referred to as PHY layer 224). In some embodiments, the back end portion 219 is configured to couple the PHY layer portion 222 to a plurality of memory ranks 230-1, ..., 230-N (individually or collectively referred to as memory ranks 230) of a first memory device 226 and a plurality of memory ranks 232-1, ..., 232-M (individually or collectively referred to as memory ranks 232) of a second memory device 228-1, ..., 228-N (individually or collectively referred to as second memory device 228). The media controller 220 can operate following both open-page policies and a closed-page policies. As used herein, the term "open-page policy" generally refers to a policy which allows a memory controller (e.g., media controller 220) to leave a page of memory open for a certain amount of time after a read operation or a write operation is performed. As used herein, the term "closed-page policy" generally refers to a policy that ensures that a page of memory is closed immediately after a read operation or a write operation is performed. In some embodiments, as a non-limiting example, the FeRAM memory device 228 can implement a closed-page policy with an additional requirement that the tRAS of the FeRAM memory device 228 is less than five hundred (500) ns.

In embodiments where LPCK error correction is used, the media controller portion 220 can be a single media controller 220. When implementing LPCK error correction, a plurality of channels 225-1, 225-2, 225-N, ..., 225-(N+1) (individually or collectively referred to as the plurality of channels 225) can be driven concurrently to write data to the DRAM memory device 226 and/or the FeRAM memory device 228. In some embodiments, instead of using a single media controller 220, multiple media controllers can be used to drive the plurality of channels 225 in the LPCK architecture. When multiple media controllers are used to drive the channels 225 concurrently, the media controllers are utilized substantially simultaneously.

As used herein, the term "substantially" intends that the characteristic needs not be absolute, but is close enough so as to achieve the advantages of the characteristic. For example, "substantially simultaneously" is not limited to operations that are performed absolutely simultaneously and can include timings that are intended to be simultaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the multiple memory controllers can be utilized such that they are writing data to the memory devices at the same time regardless if one of the media controllers commences or terminates prior to the other.

Each of the plurality of media controllers can receive a same command and address and drive the plurality of channels 225 substantially simultaneously. By using the same command and address for the plurality of media controllers, each of the plurality of media controllers can utilize the plurality of channels 225 to perform the same memory operation on the same plurality memory cells.

A back end portion 222 can include multiple PHY layers 224 and the media controller portion 220 that is configured to drive the channels 225 that couple PHY layers 224 to the memory ranks 230, 232. In some embodiments, the memory ranks 230, 232 can be DRAM memory ranks 230 and/or FeRAM memory ranks 232. In some embodiments, as a non-limiting example, the memory controller 200 can be coupled to the memory ranks 230, 232 through channels 225 coupled to the back end portion 219 and each of the channels 225 is coupled to four (4) memory ranks 230, 232.

The memory controller 200 can include a management unit 234 configured to initialize, configure, and/or monitor characteristics of the memory controller 200. Further, the management unit 234 can be used to execute non-memory functions. Such examples can include logging, error reporting, support of discovery by the host, security protocols management, security functions, etc. In some embodiments, the management unit 234 includes an I/O bus 238 to manage out-of-band data and/or commands, a management unit controller 240 to execute instructions associated with initializing, configuring, and/or monitoring the characteristics of the memory controller 200, and a management unit memory 242 to store codes and/or data associated with managing and/or monitoring the characteristics of the memory controller 200. An endpoint of the management unit 234 can be exposed to the host system (e.g., the host 103 shown in FIG. 1) to manage data. In some embodiments, the characteristics monitored by the management unit 234 can include a voltage supplied to the memory controller 200 or a temperature measured by external sensors, or both. Further, the management unit 234 can include an advanced high-performance bus (AHB) interconnect 236 to couple different components of the management unit 234. However, embodiments are not so limited and the management unit 234 can include other interconnects to couple the different components of the management unit 234.

As stated above, the I/O bus 238 can be configured to transfer out-of-band data and/or commands. In some embodiments, the I/O bus 238 can be a System Management Bus (SMBus). As used herein, the term "SMBus" generally refers to a single-ended simple two-wire bus for the purpose of lightweight communication. Further, the management unit 234 can include circuitry to manage in-band data. As used herein, the term "in-band signaling" generally refers to a method for signaling events and conditions using the Link between two components, as opposed to the use of separate physical (sideband) signals. Mechanisms defined herein can be implemented using in-band signaling, although in some form factors sideband signaling may be used, in the alternative.

The management unit 234 can include a management unit controller 240. In some embodiments, the management unit controller 240 can be a microcontroller that meets the Joint Test Action Group (JTAG) standard and capable, among other things, to run according to an Inter-Integrate Circuit ($I^2C$ or $I^3C$) protocol, and auxiliary I/O circuitry. As used herein, the term "JTAG" generally refers to an industry standard for verifying designs and testing printed circuitry boards after manufacture. As used herein, the term "$I^2C$" generally refers to a serial protocol for a two-wire interface to connect low-speed devices like microcontrollers, I/O interfaces, and other similar peripherals in embedded systems. In some embodiments, the auxiliary I/O circuitry can couple the management unit 234 to the memory controller 200. Further, firmware for operating the management unit can be stored in the management unit memory 242. In some embodiments, the management unit memory 242 can be a flash memory such as flash NOR memory or other persistent flash memory device.

Figure 3A:
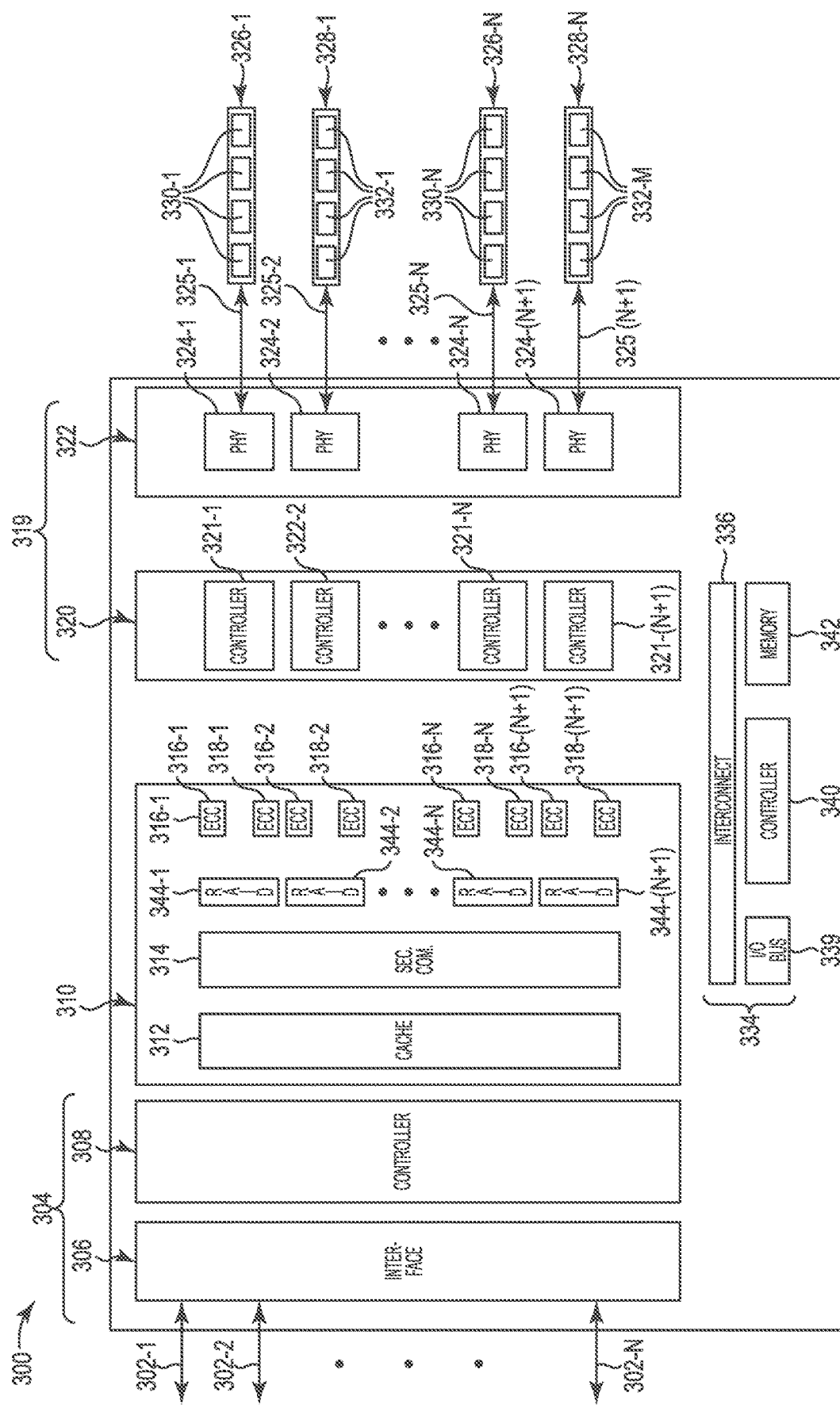
FIG. 3A illustrates a block diagram in the form of another controller for security management of a ferroelectric memory device in accordance with a number of embodiments of the present disclosure.

FIG. 3A illustrates a block diagram in the form of another controller 300 for managing multiple types of memory in accordance with a number of embodiments of the present disclosure. A memory controller 300 is configured to manage a dynamic random access memory (DRAM) memory device 326-1, . . . , 326-N (individually or collectively referred to as DRAM memory device 326) having a first row address strobe timing (tRAS) and a ferroelectric random access memory (FeRAM) memory device 328-1, . . . , 328-N (individually or collectively referred to as FeRAM memory device 328) having a second tRAS. Further, in some embodiments, instead of managing both a DRAM memory device 326 and a FeRAM memory device 328, the memory controller 300 can be configured to manage either just DRAM memory devices 326 or just FeRAM memory devices 328. As shown in FIG. 3A, the memory controller 300 can include a front end portion 304, a central controller 310, and a back end portion 319.

As shown in FIG. 3A, the front end portion 304 can include an interface 306 that includes multiple I/O lanes 302-1, 302-2, . . . , 302-N (individually or collectively referred to as I/O lanes 302) and a controller 308 to manage the interface 306. In some embodiments the quantity of I/O lanes 302 can be eight (8) I/O lanes and in other embodiments, the quantity of I/O lanes 302 can be sixteen (16) I/O lanes. Increasing the amount of I/O lanes 302 can increase the amount of data transferred to and from the memory controller 300. In some embodiments, the I/O lanes are configured to transfer access requests to or from circuitry external to the memory controller at a rate of at least thirty-two (32) gigatransfers per second (GT/s). More specifically, each of the I/O lanes can be configured to transfer the requests at a rate of at least 32 GT/s. Therefore, increasing the number of I/O lanes can increase the amount of data written per second. Further, in some embodiments, the I/O lanes can be configured to transfer access requests to or from circuitry external to the memory controller according to a compute express link protocol.

As shown in FIG. 3A, a central controller 310 that can cause performance of a read operation or a write operation, or both can include a cache memory 312 to store data associated with the read operation or write operation, or both, and increase an efficiency of accessing the data. The cache memory 312 can be used to store data received from the host and write the stored data to the DRAM memory device 326 and/or the FeRAM memory device 328. In some embodiments, the cache memory 312 can increase the efficiency of accessing the data by allowing the FeRAM memory device 328 to receive data in 64 byte blocks. A CXL memory system (e.g., memory system 300) can request data at a granularity of 64 bytes but the data may be accessed at a granularity of 128 bytes, 256 bytes, or 512 bytes, among other non-limiting examples. Storing data in the cache memory 312 can allow the FeRAM memory device 328 to access data in 64 byte chunks because the cache memory 312 can send data in 64 byte chunks. Use of the cache memory 312 can also increase the efficiency of the memory system because the cache memory 312 can prefetch the data and store the data in multiple 64 byte blocks in the case of a cache miss. This can increase the efficiency of the CXL memory system because, instead of searching a separate memory device in the event of a cache miss, the data can be read from the cache memory 312 because the data was prefetched by the cache memory 312. Less time and energy may be used accessing the prefetched data than would be used if the memory system has to search for the data before accessing the data.

As shown in FIG. 3A, the central controller 310 can include a security component 314 to encrypt the data before storing the data in the DRAM memory device 326 or the FeRAM memory device 328 and decrypt the data before the data is transferred to the host from the DRAM 326 memory device or the FeRAM memory device 328. In some examples, the data can be encrypted by the security component 314 prior to being stored in the cache 312 or, in the alternative, the data can be encrypted by the security component 314 after being retrieved from the cache memory 312 and prior to being written to the DRAM memory device 326 or FeRAM memory device 328. As stated above, the security component 314 can encrypt the data using AES encryption. In some embodiments, the data can bypass the security component 314 and avoid encryption. For example, when data is written from the host to the DRAM memory device 326, the data can bypass the security component 314 and be written into the DRAM memory device 326 as unencrypted data. The data can bypass the security component when being written to the DRAM memory device 326 because the DRAM memory device 326 may not have the same vulnerabilities as the FeRAM memory device 328. This can increase the efficiency of a CXL memory system because bypassing the security component 314 can decrease the power consumed and/or the time used to transfer data. Therefore, by engaging the security component 314 in circumstances when the security component 314 provides a more significant benefit and bypassing the security component 314 in circumstances where the security component 314 provides a less significant benefit, the efficiency of the memory system will increase.

As shown in FIG. 3A, the central controller 310 can include ECC encoding circuitry 316-1, 316-2, 316-N, . . . , 316-(N+1) (individually or collectively referred to as ECC encoding circuitry 316) to ECC encode the data and ECC decoding circuitry 318-1, 318-2, 318-N, . . . , 318-(N+1) (individually or collectively referred to as ECC decoding circuitry 318) to ECC decode the data. In some embodiments, the central controller 310 can also include a plurality of redundant array of independent disks (RAID) components 344-1, 344-2, 344-N, . . . , 344-(N+1) (individually or collectively referred to as RAID components 344) to store the data. However, embodiments are not so limited and some embodiments may not include the RAID components. As used herein, the term "RAID components" generally refers to data storage virtualization technology that combines multiple physical disk drive components into one or more logical units for the purposes of data redundancy, performance improvement, or both.

Each of the RAID components 344 can be coupled to different ECC encoding circuitry 316 and ECC decoding circuitry 318. In some embodiments, each of the RAID components 344 can correspond to one of the media controllers 321-1, 321-2, 321-N, . . . , 321-(N-+1) (individually or collectively referred to as media controllers 321). This allows a separate RAID component 344 and a separate media controller 321 to be dedicated to each of the channels 325-1, 325-2, . . . , 325-N, 325-(N+1). A RAID state machine can implement the functionality of the RAID components 344. By dedicating a separate RAID component 344 and a separate media controller 321 to each channel 325, each channel 325 can be driven individually and receive a separate command and address than other channels 325. In some embodiments, each media controller 321 executes commands independently of the other media controllers 321. This RAID architecture can provide more flexibility to the memory system in regard to how much data is written to a memory device 326, 328 and when the data is written to a memory device 326, 328 in comparison to the LPCK architecture. In some embodiments, a RAID component 344 can be striped across multiple channels 325. If a RAID component 344 is striped across multiple channels 325, a RAID state machine can be shared across multiple channels 325. This allows a RAID component 344 to drive a plurality of channels 325 substantially simultaneously. As described above, the RAID components 344 may be optional and some embodiments can function without the RAID components 344.

As shown in FIG. 3A, the memory controller portion 300 can include a back end portion 319 including a media controller portion 320 comprising a plurality of media controllers 321 and a physical (PHY) layer portion 322 comprising a plurality of PHY layers 324-1, 324-2, . . . , 324-N+1 (individually or collectively referred to as PHY layers 324), wherein the back end portion 319 is configured to couple the PHY layer portion 322 to a plurality of memory ranks. In some embodiments, the memory ranks can include DRAM memory ranks 330-1, . . . , 330-N (individually or collectively referred to as DRAM memory ranks 330) and FeRAM memory ranks 332-1, . . . , 332-M (individually or collectively referred to as FeRAM memory ranks 332). Further, in some embodiments, the memory ranks can include just DRAM memory ranks 330 or just FeRAM memory ranks 332. In some embodiments, the back end portion 319 can be connected to the plurality of memory ranks 330, 332 through the plurality of channels 325 and each of the plurality of channels 325 is coupled to memory ranks 330, 332 in a range of one (1) to eight (8) memory ranks 330, 332. In some embodiments, each of the plurality of channels 325 is coupled to five (5) memory ranks.

As stated above, each media controller 321 can correspond to a RAID component 344, as well as ECC encoding circuitry 316 and ECC decoding circuitry 318. As described above, the RAID components, in some embodiments, may be optional. Each media controller 321 can also correspond to one of the plurality of PHY layers 324. Each PHY layer 324 can be coupled to a DRAM memory device 326 or a FeRAM memory device 328 through a channel 325. In some embodiments, each media controller 321 can execute commands independent of the other media controllers 321. Therefore, data can be transferred from a PHY layer 324 through a channel 325 to a memory device 326, 328 independent of other PHY layers 324 and channels 325.

As shown in FIG. 3A, the memory controller 300 can include a management unit 334 configured to initialize, configure, and/or monitor a plurality of characteristics of the memory controller 300. Further, the management unit 334 can be used to execute non-memory functions. Such examples can include logging, error reporting, support of discovery by the host, security protocols management, security functions, etc. The management unit 334 can include an I/O bus 339 to transfer out-of-band data and/or commands, a processor (e.g., "controller") 340 to execute instructions associated with initializing, configuring, and/or monitoring characteristics of the memory controller 300, and a management unit memory 342 to store codes and data associated with managing and/or monitoring the characteristics of the memory controller 300. The characteristics of the memory controller 300 that the management unit 334 can monitor can include, but are not limited to, the amount of voltage being applied to the memory controller 300 and the temperature of the memory controller 300.

Figure 3B:
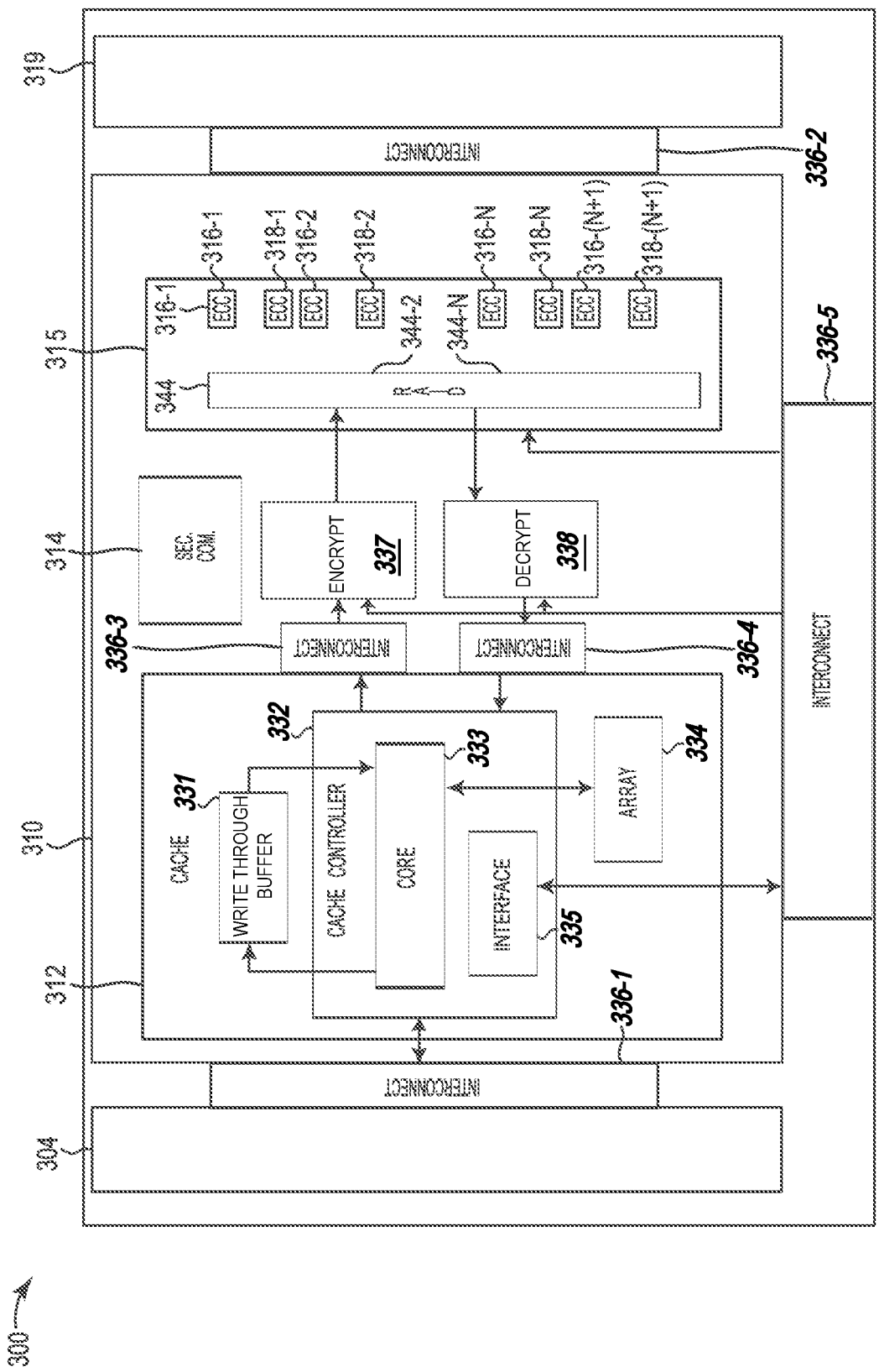
FIG. 3B illustrates a block diagram in the form of a controller including a security component for security management of a ferroelectric memory device in accordance with a number of embodiments of the present disclosure.

FIG. 3B illustrates a block diagram in the form of a memory controller 300 including a security component 314 for security management of a ferroelectric memory device in accordance with a number of embodiments of the present disclosure. The memory controller 300 can include a front end portion 304 (such as front end portion 104, 204, and 304 in FIGS. 1, 2, and 3A, respectively), a central controller 310 (such as central controller 110, 210, and 310 in FIGS. 1, 2, and 3A, respectively), and a back end portion 319 (such as back end portion 119, 219, and 319 in FIGS. 1, 2, and 3A, respectively). The front end portion 304 can be connected to the central controller 312 through an interconnect 336-1. The central controller 310 can be connected to the back end portion 319 through an interconnect 336-2. Further, an interconnect 336-3 can connect a cache controller 332 of the cache 312 to the encryption core 337 of the security component 314 and an interconnect 336-4 can connect the cache controller 332 to the decryption core 338 of the security component 314.

The cache 312 can include a write buffer 331, a cache controller 332, and an array 334. The cache controller 332 can include a core 333 and an interface 335. The interface 335 can be a cache interface and a cache telemetry component. Data can be received from a host to the front end 304 and be transferred to the cache 312 through the interconnect 336-1. The data can be transferred through the core 333 to the write buffer 331 and back to the core 333. Data can also be transferred to the array 334 of the cache 312. The cache controller 332 can send data to the encryption core 337 of the security component 314 through the interconnect 336-3 or receive data from the decryption core 338 of the security component 314 through the interconnect 336-4.

The persistent data sent through the core 333 can be protected based on an AES, such as AES-XTS 256 protocol. In the example where the data is encrypted after being received from the cache, the protection can be applied on a single cache line basis, however embodiments are not so limited. The AES-XTS encryption can be enabled and/or disabled based on security preferences as Low Power Double Data Rate 5 (LPDDR5) protocol may not require data at-rest protection. Further, an operating system hypervisor of the host can partition memory with unique per-virtual machine (VM) encryption keys in order to ensure data is confidential between VMs. While the descriptions herein include data encryption through AES including CXL module implementations based on non-volatile memories, embodiments are not so limited and may include implementations based on persistent memories.

Examples of security operations can include a MemInv operation that includes encrypting new metadata states, a MemRd operation that includes decrypting addressed data and encrypting new metadata states (if Meta0=S), a MemRdData operation that includes decrypting addressed data, a MemSpecRd operation that includes decrypting addressed data and encrypting new metadata states (if Meta0=S) when executed, and a MemWr operation that includes encrypting addressed data and new metadata states. The cache 312, security component 314, and RAID/ECC component 315 can be used to perform these security operations. Data bandwidth to and from the encryption core 337 and decryption core 338 can be a 32 gigabit (GB) per second bandwidth, including to and from the RAID component 344 from the security component 314. While embodiments are described as including the RAID component 344, embodiments are not so limited and some embodiments may not include the RAID component 344 as the RAID component may be optional.

In some embodiments, the firmwares and bootloaders of the memory system 300 can be digitally signed and can be verified during a download process before being programmed in the non-volatile memory device where the firmware and bootloader are stored. This can prevent the introduction of malware onto memory system which could be used to circumvent the security features of the memory device. Firmware downloads can be in-band, or use a standard interface as opposed to a sideband or out-of-band channel, and based on CXL device commands (e.g., Get FW Info, Transfer FW, and Activate FW). An in-band channel can refer to a channel connecting the device and the main host. An out-of-band (OOB) channel can refer to a channel connecting the device and support host system (e.g., BMC). A side-band channel is an interface on the device to implement the OOB channel. The boot loader and main firmware can be signed using a Rivest-Shamir-Adleman (RSA) operation. Firmware can support security version checking—used for anti-rollback protection. The security version of the boot loader and main firmware can be stored on the memory device and can be considered a public security parameter, as it specifies the highest security version of firmware installed on the memory device. The security measures of a bootloader (FIG. 4) and a firmware image (FIG. 5) will be further described below.

In some embodiments, a sideband interface, such as a JTAG, can be used. In some examples, a JTAG debug interface can be used when communicating with a CPU. This can allow inspection of any IP mapped in the CPU address space. However, there is a risk that through this setup it may be possible to reach memory areas that contain critical data. Therefore, this JTAG interface may need to be disabled by means of a specific mechanism. The specific mechanism can be able to switch between two states (e.g., JTAG enabled and JTAG disabled) in a finite number of times. This can mitigate errors that may occur in the production process of the memory device. The transition between one of the two states may take place under controlled conditions (e.g., specific laboratory or production lines) and done so exclusively by those authorized to do so. In some examples, the JTAG interface may be permanently disabled once the memory device is ready to leave the production process.

In some examples, the JTAG interface switch could be based on a set of One Time Programmable (OTP) bits whose overall logic state, through a combinatorial logic network, outputs a single status bit which encodes the status of enabled or disabled for the JTAG interface. As an example, as illustrated in Table 1, an OTP bit status can indicate a corresponding JTAG status:

TABLE 1

| OTP bits status | JTAG status |
| --- | --- |
| 000 | Enabled |
| 001 | Disabled |
| 011 | Enabled |
| 111 | Disabled |

Since OTPs can only switch states once, other state combinations are not significant. For example, starting from state 011, having following sequence 000 to 001 to 011, it may not be possible to reach state 101.

In some embodiments, a serial port based interface (e.g., a sideband interface such as a Universal Asynchronous Receiver/Transmitter (UART)) is used for ROM monitoring, such as issuing commands to the memory system for various purposes. Further, the sideband interface can be used for a secondary boot source (through as its possible to load a binary firmware image and run it through this type of interface). Further, in some examples, the sideband interface can be permanently disabled in order to reduce access to the system and preserve data integrity. Such a sideband interface could be limited to read-only reduced form to eliminate in the firmware the possibility of entering commands by a user. For security purposes, two different firmware images can be created, one in which all code is dedicated to management of the sideband interface when the sideband interface is present and one in which the sideband interface is present in the previously mentioned reduced form. This can be achieved by starting with a single source code and using some features offered by programming languages to selectively exclude certain parts of the code. Here is an example of such a pseudo C code:

```
#ifdef FULL_UART_CODE
/*
 * place here the code that fully implements the UART interface
 */
#else
/*
 * place here the code that does not implement the UART
interface
 */
#fi
```

To prevent the use of a debug interface as a secondary boot device, an OTP bit can be used such as the following:
  OTP bit: 0→boot from UART enabled
  OTP bit 1→boot from UART disabled In some embodiments, a system management bus (SMBus) interface can be a sideband bus whose signals are placed side by side with those sent across a main bus. This SMBus interface can be used to implement remote management without having to rely on the resources of the host system in which they are installed (e.g., MCTP protocol uses SMBus as an implementation of the physical layer of its stack). This sideband interface can be used for the transmission of service messages of the out-of-band (OOB) type addressed to the management unit (e.g., management 134 in FIG. 1). These side-band service messages can be addressed to the device and may be intercepted and processed by the management unit (such as management unit 134 in FIG. 1). In the example where the sideband interface is an out-of-band (OOB) bus, the sideband interface can be used at the system level for enterprise applications. In some examples where the sideband interface is a JTAG or UART interface, the sideband interface can be used for production of the memory device and, once produced and ready for customer use, can be removed.

In some embodiments, a side channel attack can exploit a correlation between a physical variable (e.g., power consumption, EM emission, etc.) and a secret (e.g., a key) which can be manipulated by the memory system. This type of side channel attack can be used against encryption 337 and decryption 338 cores, as the cores 337/338 compute a constant small secret (e.g., key) several times. The correlated variable can "leak" the secret, and such a "leak" is called a trace. Side Channel Attacks can be divided into three different categories such as a Simple Power Analysis (SPA) where the correlation can be extracted using a single trace, a Differential Power Analysis (DPA) where thousands or hundreds of thousands of traces can be correlated to a leakage model to extract the secret or key, and Template Attacks where a leakage template is built on a different memory device and correlated on the victim device using one trace.

Cryptographic cores described herein can be divided into two groups of cores referred to as high-rate ciphers and low-rate ciphers. A high-rate cipher uses the same key within high bandwidth data traffic and is used for CXL link encryption and data at-rest encryption, described herein. A low-rate cipher, which may be rate-limited, can be used for secure boot image verification, described further below in association with FIGS. 4-5, and/or CSP encryption/decryption to maintain data integrity and security. High-rate ciphers can allow collection of multiple traces, and thus may be vulnerable to SPA, DPA, and/or template attacks. Low-rate ciphers use limited execution and thus may be vulnerable to SPA attacks only.

In some embodiments, a cache attack can be used that allows an attacker to infer the access pattern of other processes of a memory device or virtual machines that share the same cache, such as cache 312. The memory access pattern could reveal an encryption key during execution of security software (e.g., during software AES), or could be used to infer searched keywords or keystrokes. Cache attacks can be based on interference between processes, which may use knowledge of a cache mapping function to cause cache collisions and measure the cache access latency. An effective countermeasure against cache attacks can be to randomize the cache mapping function, thereby making the attacker infer the new mapping function before attempting the attack. Changing the cache mapping function clears the cache and, to limit the performance drawback, a probabilistic permutation of the cache mapping function can be implemented.

In some embodiments, a glitch attack can be used against a memory device. A glitch attack refers to an attack directed at a side-channel (e.g., an EMF, voltage supply/ground, clock, laser, body-bias, probe needle, etc.) used to inject a fault into the system, which can be sufficient to disrupt a normal cycle of firmware execution, without doing permanent damage to the memory system circuitry. Examples of such disruptions can include authentication bypass, which is used to prevent unauthorized access to restricted vendor specific (VS) commands, and code execution deviations, which can result in unintended or incorrect memory security decisions. In order to mitigate such glitch attacks, a combination of detection and resilience can be used so that the memory system is able to detect when an attack is being attempted and can respond with procedures to recover securely from the attack.

Resilience can be achieved by building redundancy into the hardware and software architecture of the memory system. This can ensure that, on detection of a glitch attack, the memory system can automatically resume safe memory operation. Fault injection (FI) detection and mitigation can be implemented using at least one of the following: hardware based FI monitoring and detection and firmware based mitigation coding techniques. When possible, if an FI event is detected, then firmware can log the event. However, in some examples, logging can be limited in order to avoid log overflows.

Further, in some embodiments, where data is made persistent by the use of non-volatile memory device, such as ferroelectric memory devices, and may survive power cycles, specific countermeasures can be used to avoid data tampering or extraction if the memory device or portions of the memory device are removed. Security requirements related to a memory system can apply whether the memory device is using non-volatile or volatile memory devices. Security requirements can include encryption of data stored on a memory device and/or secure erasure of the data stored on the memory device.

In some embodiments, where a portion of the memory system may be removable and data may persist after removal (e.g., using non-volatile memory), erasure of data may be used to ensure data security. In such situations, two types of data removal can be considered with different impacts on the operation execution time. A first type of data removal can be a cryptographic erase which can zero out encryption keys so data is not recoverable, even by an authenticated user. A second type of data removal can be a physical removal of the content of the entire memory media, overwriting user data and meta-data on all types of media (e.g., volatile and non-volatile memory devices) in the memory system.

In relation to these two types of data removal, there can be two types of operations that are driven by specific CXL memory device commands. A first type of CXL memory device command can be a secure erase command that implies erasure of the encryption keys and their replacement with freshly generated encryption keys. A second type of CXL memory device command can be a sanitize command that, when received, causes a controller (such as central controller 310) to physically remove data from a portion or all portions of a memory device in the memory system. This can be achieved by either issuing a wipe command if supported by the protocol (e.g., a non-volatile memory (NVM) protocol, a non-volatile random access memory protocol, etc.) or programming known patterns N times to overwrite the data content stored on the memory device. In one embodiment, a power level can be monitored and a threshold power level can be maintained during execution of the sanitize command. This is to track and, if needed, store the progress of the sanitize operation in order to resume the sanitize operation in case of interruption, e.g., read/write interruption or power interruption.

Figure 4:
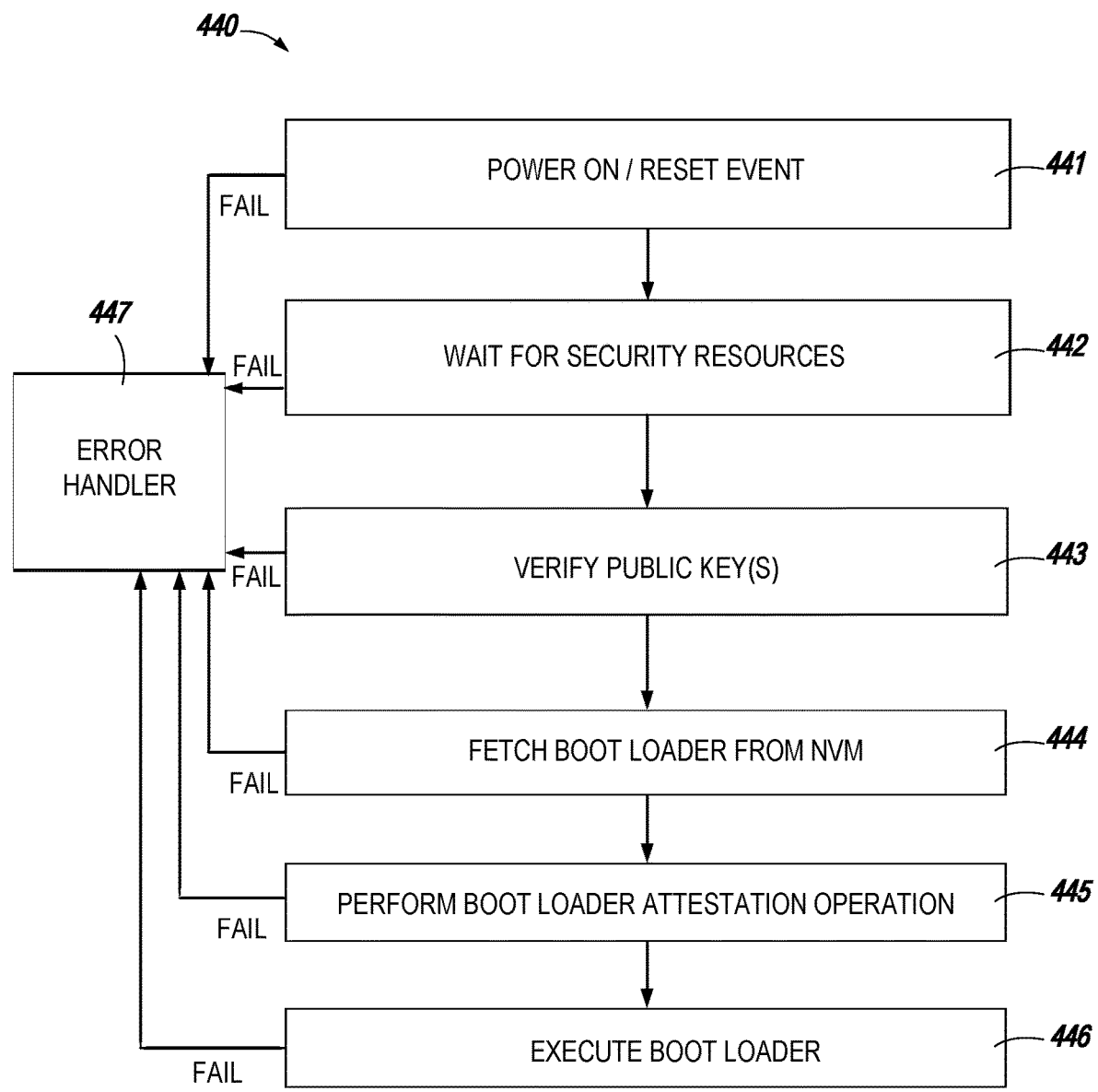
FIG. 4 illustrates a block diagram illustrating operations for security management of a ferroelectric memory device in accordance with a number of embodiments of the present disclosure.

FIG. 4 illustrates a flow diagram of an example method 440 for security management of a boot operation in accordance with a number of embodiments of the present disclosure. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

The method 4 can be used to perform a secure boot operation. The secure boot operation can verify firmware binary image integrity and ensure its correct loading and execution. The method can be performed by a management microcontroller that includes a main processor and a security subsystem that includes a dedicated central processing unit (CPU), a dedicated crypto hardware component, a random number generator, and a crypto key storage. In some examples, the main processor and the security subsystem can be two distinct objects or two logical partitions of a single object. The secure boot operation can perform capabilities including protection against external firmware boot and protection against boot of unauthenticated firmware (e.g., modified, rolled back, etc.). The secure boot operation can perform capabilities including setup of a secure execution environment (SEE) to validate all firmware images. The secure boot operation can include ROM code features that include boot loader integrity, identification, and authentication. Further, the secure boot operation can verify authenticity and integrity of the boot loader, using manifest signature, via a digital signature (e.g., RSA signature).

At block 441, the method 440 can include performing a power ON and resetting of an event. At block 442, the method 440 can include waiting for security resources. The security resources can include completion of initialization and/or a self-test before proceeding.

At block 443, in response to completion of the security resources, the method 440 can include verifying public key(s). As an example, a public key can be read and validated by loading a block of data including the public key used by a bootROM and the public key can be associated with a boot loader image. A bootROM can refer to a portion of data stored in a read-only memory (ROM) that is the first code executed by a boot process when the memory device is powered on. This can be performed by comparing a digest of the public key with a digest of the key which was previously computed and stored in the device's immutable non-volatile memory (NVM). At block 444, the method 440 can include fetching a boot loader from non-volatile memory ("NVM"). As an example, the boot loader can be located in the NVM and read from the NVM. In addition, the fetching operation can be in charge of or manage the BootROM.

At block 445, the method 440 can include performing a boot loader attestation operation. The boot loader attestation operation can include validating a boot loader image via a digital signature algorithm (Rivest-Shamir-Adleman or RSA) with the public key that was previously validated as input into the digital signature algorithm. At block 446, in response to successful boot loader attestation, the boot loader can be loaded and executed. In response to any of the operations associated with blocks 441 through 446 not being performed or completed, the secure boot operation can be indicated as failing and the boot sequence can be terminated and the error handler invoked, as illustrated at block 447.

Figure 5:
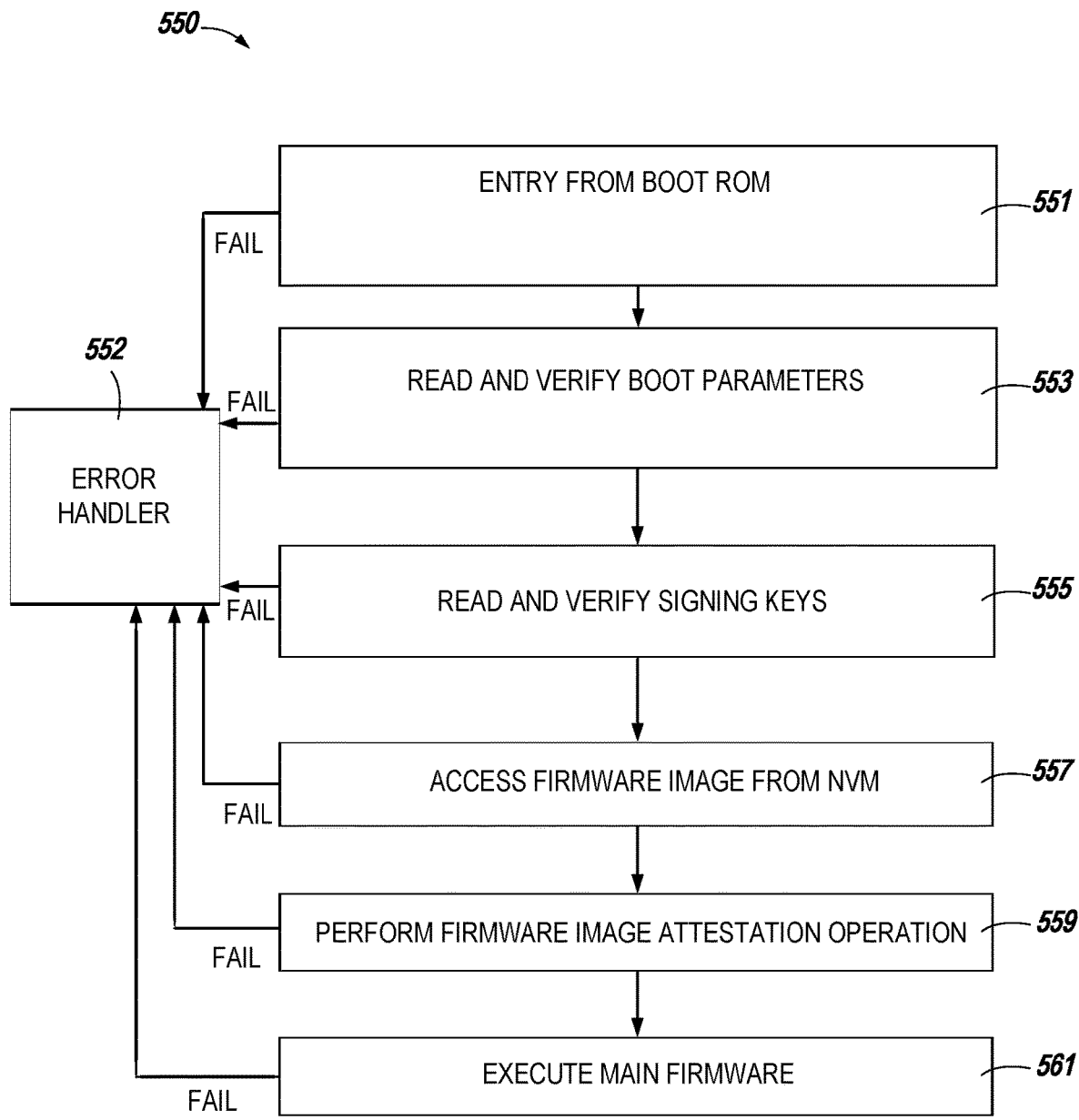
FIG. 5 illustrates a block diagram illustrating operations for security management of a ferroelectric memory device in accordance with a number of embodiments of the present disclosure.

FIG. 5 illustrates a flow diagram of an example method 550 for security management of a boot operation in accordance with a number of embodiments of the present disclosure. The method 550 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified.

The method 550 can be used to perform a secure boot operation. The secure boot operation can be performed to check integrity main firmware and load the main firmware. The firmware image and the bootloader can be validated under the control of its own ROM code. When the ROM code transfers the bootloader and control of the verified image, the security mode can be maintained.

At block 551, the method 550 can include entering from a boot ROM. At block 553, the method 550 can include reading and verifying boot parameters from a non-volatile memory (NVM). These boot parameters can be considered public security parameters and their integrity must be checked to complete the loading of the boot firmware. At block 555, the method 550 can include reading and verifying signing keys. This verification can be performed to check the integrity of the main firmware by reading the public key associated with the firmware image. The public key can be verified by comparing a digest of the public key with the digest of the key which was previously computed and stored in the device's immutable NVM.

At block 557, the method 550 can include accessing the firmware image from non-volatile memory (NVM). At block 559, the method 550 can include performing firmware image attestation. The firmware image attestation can verify the firmware image via a digital signature algorithm (e.g., RSA) with the public key that was verified previously as input into the digital signature algorithm. At block 561, the method 550 can include, in response to the attestation being successful, executing the main firmware. In response to any of the operations associated with blocks 551 through 561 not being performed or completed successfully, the secure boot operation can be indicated as failing and the boot sequence can be terminated and the error handler invoked, as illustrated at block 552.

Figure 6:
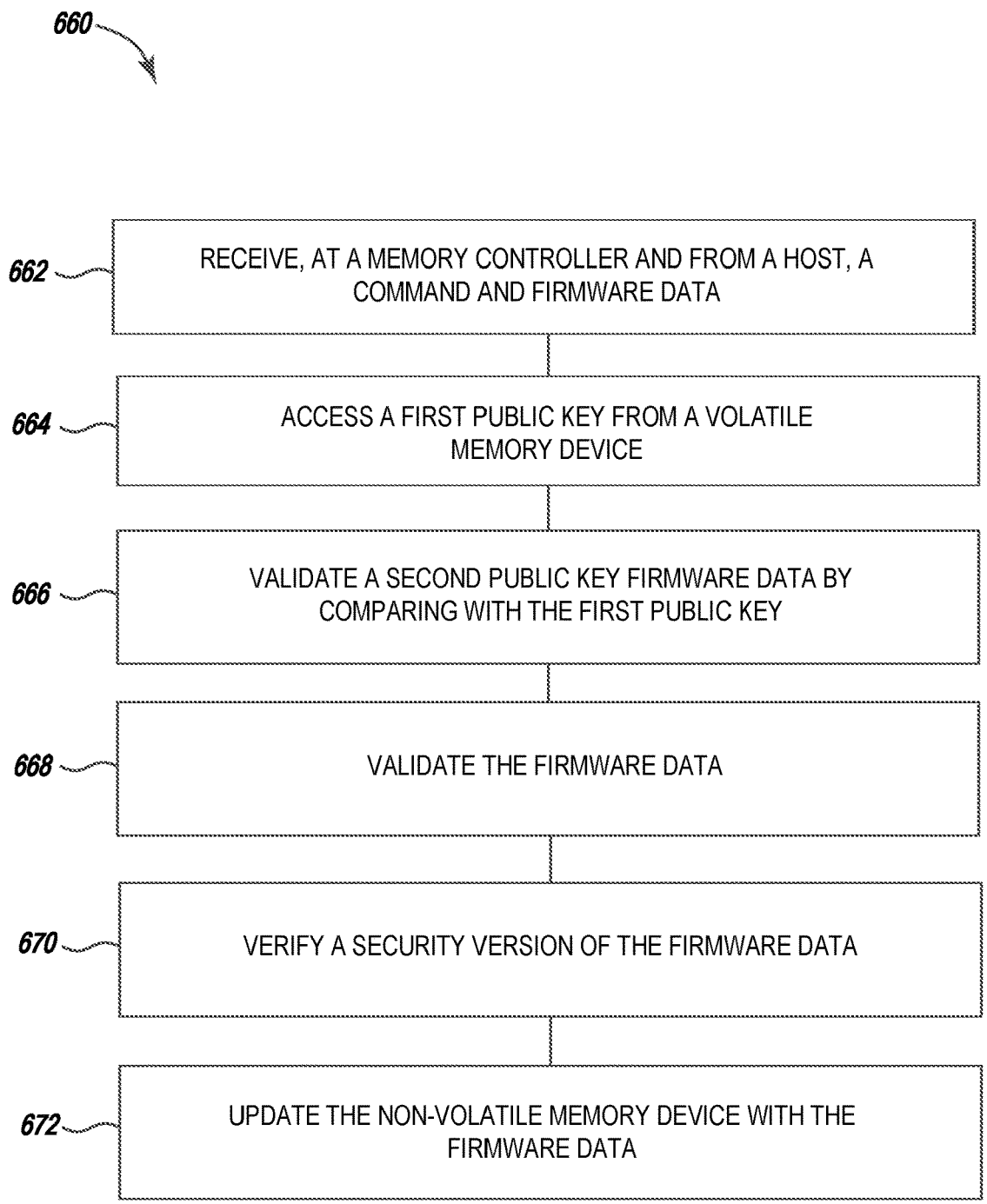
FIG. 6 illustrates a flow diagram of an example method for security management of a ferroelectric memory device in accordance with a number of embodiments of the present disclosure.

FIG. 6 illustrates a flow diagram of an example method 660 for security management of a ferroelectric memory device in accordance with a number of embodiments of the present disclosure. While embodiments described herein refer to security management of a ferroelectric memory device, embodiments are not so limited. For example, other types of memory can be included with the security management. The method 660 can include performing a Secure Field Firmware Update. The method 660 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

At block 662, the method 660 can include receiving, at a memory controller and from a host, a command and firmware data. The memory controller can be a controller such as central controller 110, 210, and 310 in FIGS. 1, 2, and 3A-3B, respectively. The command can be a CXL transfer firmware command and can initiate a firmware package download and/or update. The firmware package can be transferred entirely or in parts. The firmware package can be temporarily stored in buffers of the controller. The memory controller can manage a non-volatile memory device using a compute express link (CXL) protocol, as described above. The command can be executed to update firmware stored on the non-volatile memory device.

At block 664, the method 660 can include accessing a first public key from a volatile memory device. The first public key can be a public signing key and can be accessed by reading the first public key from the non-volatile memory device. In response to the first public key not being validated during a boot of the memory system, the firmware can validate at this time. Further, in response to the first public key being accessed, a controller can check that a target slot for the firmware update is a same slot as the active slot. In response to the target slot and the active slot being different, an invalid slot return code can be issued and the firmware update can be terminated.

At block 666, the method 660 can include validating a second public key within the firmware data by comparing with the first public key. The second public key can be a public key from a firmware image and the first public key can be a public key that was previously stored in the non-volatile memory device.

At block 668, the method 660 can include validating the firmware data. The firmware data can be validated using an RSA operation. At block 670, the method 660 can include verifying a security version of the firmware data. The security version of the firmware data can be the currently installed version of the firmware data. Further, a customer ID can be checked in order to ensure anti-cloning of the firmware data. This check can be performed to ensure that the firmware and a location it is being installed or updated onto is homogenous or compatible. In response to the customer ID check failing, the firmware data can invoke its error handler and terminate the firmware data update.

At block 672, the method 660 can include updating the non-volatile memory device with the firmware data. In response to the customer ID check being successful and the previous steps being completed, the non-volatile memory device can be updated. In response to the firmware update being performed, a host may issue a CXL Activate firmware command that enables the updated firmware package. The firmware data can then update all applicable data (e.g., data structures) in the non-volatile memory device (e.g., the security versions, the slot ID, message authentication code (MAC), etc.).

Figure 7:
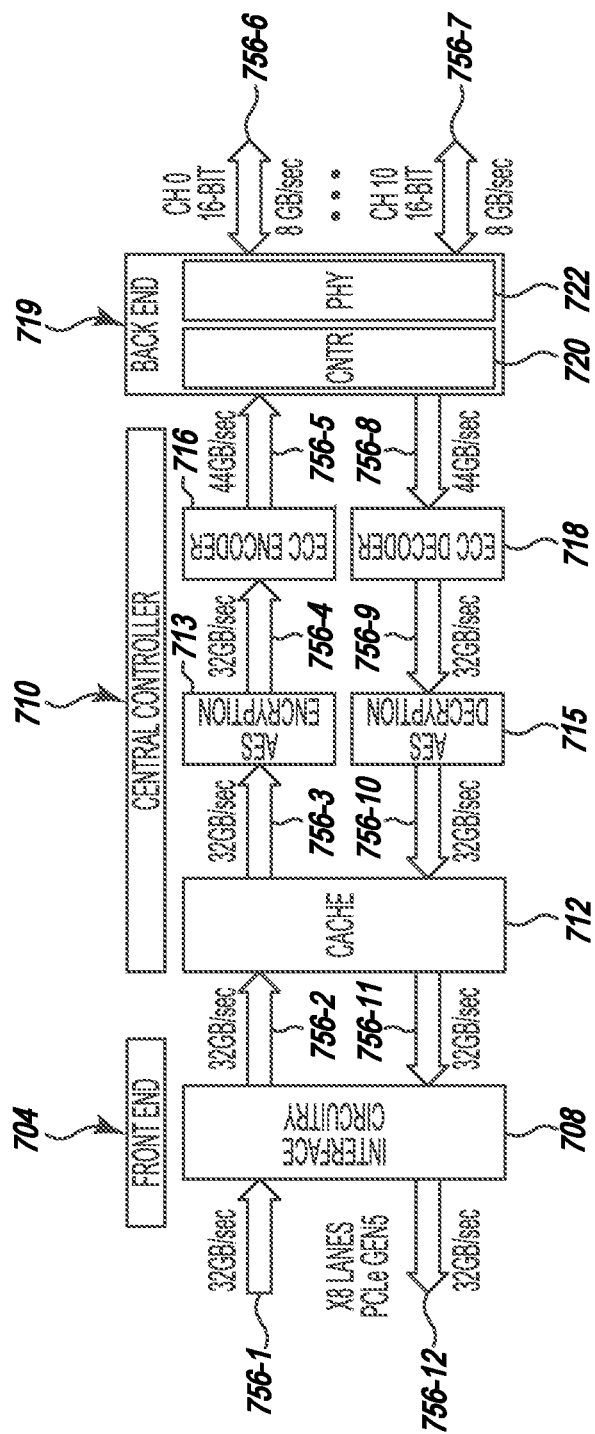
FIG. 7 illustrates a controller for security management of a ferroelectric memory device in accordance with a number of embodiments of the present disclosure.

FIG. 7 illustrates a block diagram illustrating a flow of data through a controller for managing multiple types of memory in accordance with a number of embodiments of the present disclosure. The bandwidths 756-1, 756-2, 756-3, 756-4, 756-5, 756-6, 756-7, 756-8, 756-9, 756-10, 756-11, 756-12 (individually or collectively referred to as bandwidth 756) of the I/O bus between components in the front end portion 704, the central controller portion 510, and the back end portion 719 of a memory controller are shown. As used herein, the term "bandwidth" generally refers to a maximum amount of data written from one component in a memory system to another component within the same memory system or external to the memory system in a given amount of time.

As shown in FIG. 7, the front end portion 704 can include circuitry 708 for managing an interface between the host and the front end portion 704. In some embodiments, the interface can be a PCIE 5.0 interface including either 8 I/O lanes or 16 I/O lanes (not illustrated in FIG. 7 but can be used in some embodiments). In some embodiments, each of the I/O lanes between the host and the front end portion 704 may have a bandwidth 756-1, 756-12 of 32 gigabytes per second (GB/s).

The bandwidth 756-2, 756-11 of I/O circuitry between the front end portion 704 and the central controller portion 710 can be 32 GB/s. In some embodiments, the central controller portion 710 can include a cache memory 712, encryption circuitry 713, decryption circuitry 715, ECC encoder circuitry 716, and ECC decoder circuitry 718. In some embodiments the encryption circuitry 713 can be AES encryption circuitry 713 and the decryption circuitry 715 can be AES decryption circuitry 715. As shown in FIG. 7, data in the central controller portion 710 can be written from the cache memory to the AES encryption circuitry 713. In some embodiments, the bandwidth 756-3 of the I/O circuitry from the cache memory 712 to the AES encryption circuitry 713 can be 32 GB/s. The data can travel from the AES encryption circuitry 713 to the ECC encoder circuitry 716. In some embodiments, the I/O circuitry between the AES encryption circuitry 713 and the ECC encoder circuitry 716 can have a bandwidth 756-4 of 32 GB/s. Further, the I/O circuitry between the AES decryption circuitry 715 and the ECC decoder circuitry 718 can have a bandwidth 756-9 of 32 GB/s.

In at least one example, and as shown in FIG. 7, I/O circuitry coupling the central controller portion 710 and the back end portion 719 of the memory controller can have a bandwidth 756-5, 756-8 of 44 GB/s. The back end portion 719 can include a media controller 720 and a PHY layer portion 722. The PHY layer portion 722 can couple to a DRAM memory device and a FeRAM memory device through a plurality of channels. In some embodiments, each of the plurality of channels can have a bus width of sixteen (16) bits and a bandwidth 756-6, 756-7 of 8 GB/s. Parity bits can consume 3/11 of the total bandwidth 756-6, 756-7 of a channel that connects the back end portion 719 to a DRAM memory device or an FeRAM memory device. While specific bandwidth numbers are described above, examples are not so limited. For example, any number of bandwidth values can be used for performing the operations. The remaining data throughput can travel at a speed of 64 GB/s which matches a PCIe raw bandwidth for downstream data (e.g., 32 GB/s) added to upstream data (e.g., 32 GB/s). As used herein, the term "downstream data" can refer to data sent from a computer or network and the term "upstream data" can refer to data received by computer or network.

In some embodiments, downstream data can be data received by the memory controller and upstream data can be data sent from the memory controller. In some embodiments, the bandwidth 756 requirements can be modified (e.g., increased or decreased) based factors including, but not limited to, the efficiency of the bus (e.g., the PCIe bus) and/or the memory system, the cache hit rate, the efficiency of the media controller 720, and the DRAM memory device bus turnaround cycle, and the DRAM memory device bus rank-to-rank timing (e.g., rank switching). As used herein, the term "turnaround cycle" generally refers to the amount of time it takes for a memory device to alternate between a read operation and a write operation. As used herein, the term "rank-to-rank timing" generally refers to the time period between completing a memory operation on a rank of a memory device and starting a memory operation on another rank of the memory device.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example, a plurality of reference elements 216-1 to 216-N may be referred to generally as 110. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
   a host; and
   a memory controller coupled to the host, wherein:
      the memory controller is configured to manage a dynamic random access memory (DRAM) device and a ferroelectric random access memory (FeRAM) device, wherein the memory controller and the host communicate using a compute express link (CXL) protocol; and
      the memory controller comprises:
         a front end portion, comprising:
            an interface configured to couple the memory controller to the host through a plurality of input/output (I/O) lanes; and
            circuitry to manage the plurality of I/O lanes; and
         a central controller portion configured to, in response to receiving a request from the host, perform a security memory operation, wherein the central controller portion comprises:
            a cache memory to buffer data associated with performance of the security memory operation; and
            a security component configured to encrypt data before the data is stored in the DRAM device, the FeRAM device, or the cache memory.

2. The system of claim 1, wherein the memory controller further comprises a back end portion comprising a media controller and a physical (PHY) layer, the back end portion configured to couple the memory controller to a plurality of memory ranks.

3. The system of claim 1, wherein the host is configured to send a Secure Erase CXL command, using the CXL protocol, to cause erasure of an encryption key used to recover data on the FeRAM device.

4. The system of claim 3, wherein the central controller is to perform the erasure of the encryption key in response to receiving the Secure Erase CXL command that indicates to erase the encryption key and replaces the encryption key with a generated encryption key.

5. The system of claim 1, wherein the host is configured to send a command, using the CXL protocol, to remove data stored on the FeRAM device.

6. The system of claim 5, wherein the central controller is to perform removal of the data stored in the FeRAM device in response to receiving a Sanitize CXL command.

7. The system of claim 5, wherein the central controller is configured to remove the data from the FeRAM device by performing a plurality of program operations a particular quantity of times to overwrite the data stored in the FeRAM device.

* * * * *